W. A. Wood.
Harvester Rake.
No. 2757.  33,761.
Patented Nov. 19, 1861.
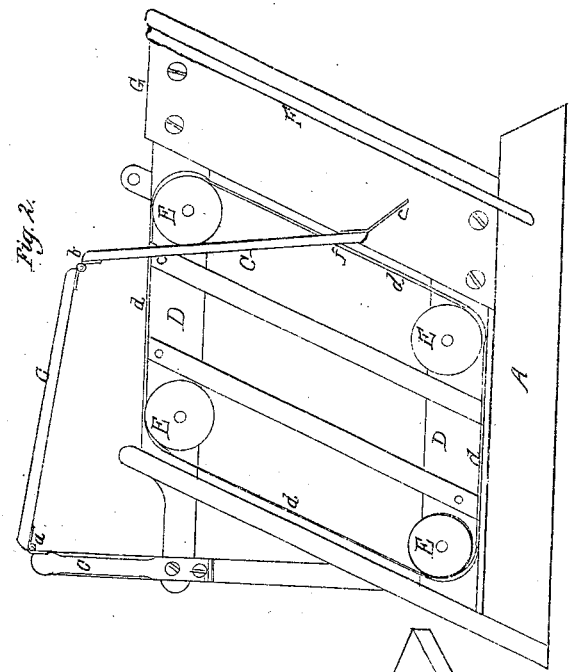
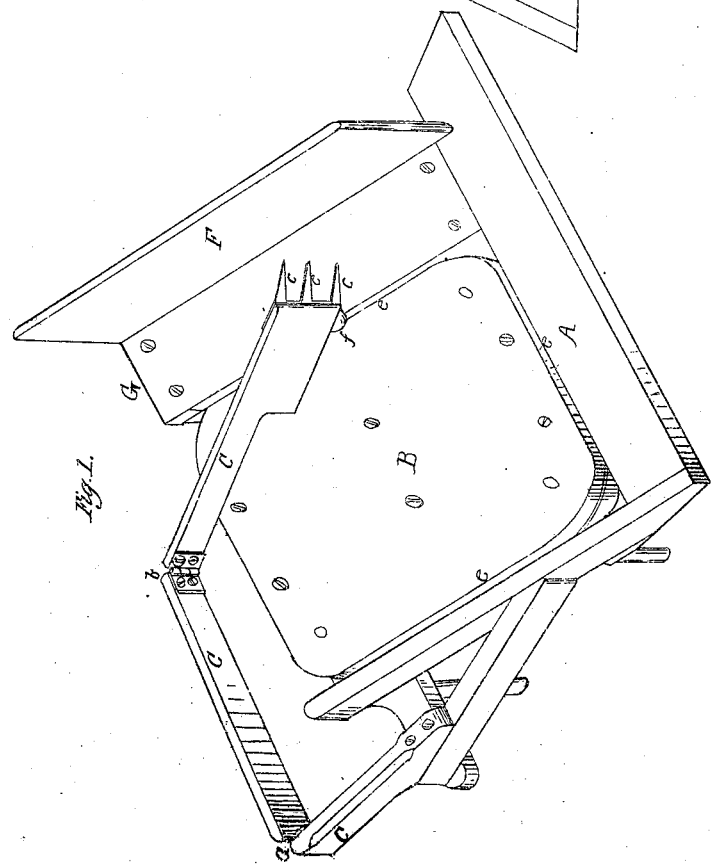

UNITED STATES PATENT OFFICE.

WALTER A. WOOD, OF HOOSICK FALLS, NEW YORK.

IMPROVEMENT IN RAKES FOR HARVESTERS.

Specification forming part of Letters Patent No. 33,761, dated November 19, 1861.

*To all whom it may concern:*

Be it known that I, WALTER A. WOOD, of Hoosick Falls, in the county of Rensselaer and State of New York, have invented a new and useful Raking Apparatus for Harvesting-Machines; and I do hereby declare the following to be a full, clear, and exact description of the same, reference being had to the accompanying drawings, making a part of this specification, in which—

Figure 1 represents a perspective view of a harvesting-machine platform or grain-table with the raking apparatus in question connected thereto. Fig. 2 represents a top plan of the platform and raking apparatus, the top of the platform being removed to show the driving-belt and pulleys underneath it.

My invention consists, first, in a double-jointed rake-stale that will, in connection with an endless moving belt, allow its rake to traverse the sides of the platform, and sweep therefrom and deliver the cut grain in a regular and compact form for binding; and my invention further consists in the connection of the jointed rake-stale to the outer or grain side of the platform, so that the delivery-point may be next to and toward the rear of the main frame, as will be explained.

To enable others skilled in the art to make and use my invention, I will proceed to describe the same with reference to the drawings.

A may represent a finger-bar, and B a platform in rear thereof, upon which the cut grain falls. This finger-bar and platform may be connected to a main frame in any of the usual well-known ways or positions, and to any of the main frames now known or in use.

On the outer or grain side of the platform is secured a rake-stale, C, which has two joints, $a\ b$, in it, its free end carrying a rake or fingers, $c$, for sweeping the grain from the platform and delivering it in a compact form for binding.

The platform-frame D has upon it, at each of its corners, a pulley, E, around which an endless belt, $d$, is caused to move by connecting one or more of the pulleys to some moving gear of the harvesting-machine in any of the ways well known to mechanicians. On that side of the platform next the main frame there is a fence, F, against and by which the gavel is directed as it is moved by the rake toward the delivery-point at G. A small stud or pin is connected to the belt $d$, which travels underneath the floor of the platform, and this stud or pin extends up through a slot or way, $e$, cut through or in said platform-floor, and enters a socket or other similar device, $f$, on the rake or its stale, so as to carry the rake around the platform and cause it to sweep off the cut grain; or the pin may be on the rake, and the socket or its equivalent device be on the traveling belt, and attain the same end. The delivery-point being at G, the gavel is deposited in a position in rear of the grain side of the main frame, and out of the way of the path of the machine on its return-swath.

By jointing the rake-stale a long stale may be used, that will enable the rake to make its traverse movement without friction, and without any sudden jar or increased or diminished speed, as is the case to a greater or less extent with all rakes that reach out far from their point of connection.

Locating a jointed rake-stale on the outer or grain side of the platform enables me to make the point at which the gavel is delivered at the side of or slightly in rear of the grain side of the main frame.

The belt $d$ should be a link or chain belt, and the pulley that drives it should be furnished with teeth or pins that will take into said links, and thus move it with a positive motion without any liability to stop or slip.

Having thus fully described my invention, what I claim is—

1. A jointed rake-stale that will, in connection with an endless traveling belt, traverse the sides of the platform, and sweep therefrom and deliver the cut grain, substantially as herein described.

2. Connecting the jointed rake-stale to the outer or grain side of the platform, so that the delivery-point for the gavel may be next to or at or near the rear of the main frame, substantially as herein described.

WALTER A. WOOD.

Witnesses:
A. B. STOUGHTON,
H. W. PRICE.